(12) United States Patent
Jauhal

(10) Patent No.: US 11,113,252 B2
(45) Date of Patent: *Sep. 7, 2021

(54) USER SELECTABLE DATA SOURCE FOR DATA RECOVERY

(71) Applicant: EMC IP Holding Company LLC, Hopkinton, MA (US)

(72) Inventor: Shern S. Jauhal, Palo Alto, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/353,751

(22) Filed: Mar. 14, 2019

(65) Prior Publication Data

US 2019/0213174 A1 Jul. 11, 2019

Related U.S. Application Data

(63) Continuation of application No. 13/927,466, filed on Jun. 26, 2013, now Pat. No. 10,235,392.

(51) Int. Cl.
*G06F 16/00* (2019.01)
*G06F 16/21* (2019.01)
*G06F 11/14* (2006.01)
*G06F 16/13* (2019.01)

(52) U.S. Cl.
CPC .......... *G06F 16/21* (2019.01); *G06F 11/1446* (2013.01); *G06F 16/13* (2019.01)

(58) Field of Classification Search
CPC .............................. G06F 16/21; G06F 11/1446
See application file for complete search history.

(56) References Cited

U.S. PATENT DOCUMENTS

| | | |
|---|---|---|
| 6,704,886 B1 | 3/2004 | Gill et al. |
| 7,330,997 B1 | 2/2008 | Odom |
| 7,360,110 B1 | 4/2008 | Schmokel et al. |
| 7,523,097 B1 | 4/2009 | Wilson |
| 7,558,840 B1 * | 7/2009 | Howard ............... G06F 11/1456 707/999.2 |
| 7,653,714 B2 | 1/2010 | Yagishita |
| 8,151,140 B2 | 4/2012 | Sim-Tang |
| 8,161,321 B2 | 4/2012 | Zheng |
| 8,260,747 B2 | 9/2012 | Wu et al. |
| 8,316,237 B1 | 11/2012 | Felsher |
| 8,365,017 B2 | 1/2013 | Sim-Tang |
| 8,375,248 B2 | 2/2013 | Sim-Tang |

(Continued)

FOREIGN PATENT DOCUMENTS

| | | |
|---|---|---|
| CN | 101795206 A | 8/2010 |
| WO | WO 2014/062191 | 4/2014 |

OTHER PUBLICATIONS

U.S. Appl. No. 13/931,609, filed Jun. 28, 2013, Juahal, Shern S.

(Continued)

*Primary Examiner* — Tamara T Kyle
*Assistant Examiner* — Lahcen Ennaji
(74) *Attorney, Agent, or Firm* — Workman Nydegger

(57) ABSTRACT

Systems and methods for performing a recovery operation for a host. A user interface is displayed and a recovery operation is configured. During configuration of the recovery operation, the source of the backup for the recovery operation can be selected by a user. The recovery operation is performed based on the user-selected backup.

18 Claims, 5 Drawing Sheets

(56) References Cited

U.S. PATENT DOCUMENTS

| | | | |
|---|---|---|---|
| 8,464,101 B1 | 6/2013 | Natanzon | |
| 8,635,189 B1* | 1/2014 | Tenzer | G06F 11/1469 707/639 |
| 9,020,896 B1* | 4/2015 | Tsaur | G06F 11/1451 707/640 |
| 9,201,887 B1 | 12/2015 | Earl et al. | |
| 9,641,486 B1 | 5/2017 | Jauhal et al. | |
| 9,703,618 B1 | 7/2017 | Jauhal | |
| 9,904,606 B1 | 2/2018 | Jauhal | |
| 10,353,783 B1 | 7/2019 | Jauhal | |
| 10,404,705 B1 | 9/2019 | Jauhal et al. | |
| 2003/0167408 A1 | 9/2003 | Fitzpatrick et al. | |
| 2004/0015578 A1 | 1/2004 | Karakashian et al. | |
| 2004/0117548 A1 | 6/2004 | Zamer | |
| 2005/0022176 A1 | 1/2005 | Ramachandran et al. | |
| 2005/0149577 A1 | 7/2005 | Okada et al. | |
| 2005/0216788 A1 | 9/2005 | Mani-Meitav et al. | |
| 2005/0240815 A1 | 10/2005 | Purkeypile | |
| 2006/0004675 A1 | 1/2006 | Bennett | |
| 2006/0010107 A1 | 1/2006 | Nguyen et al. | |
| 2006/0059253 A1 | 3/2006 | Goodman et al. | |
| 2006/0184828 A1 | 8/2006 | Wynn | |
| 2006/0242626 A1 | 10/2006 | Pham et al. | |
| 2007/0162739 A1 | 7/2007 | LaCous | |
| 2007/0168656 A1 | 7/2007 | Paganetti et al. | |
| 2007/0185922 A1 | 8/2007 | Kapoor et al. | |
| 2007/0271314 A1 | 11/2007 | Ban | |
| 2008/0154989 A1 | 6/2008 | Arman | |
| 2009/0037517 A1 | 2/2009 | Frei | |
| 2009/0164529 A1 | 6/2009 | McCain | |
| 2009/0172689 A1* | 7/2009 | Bobak | G06F 9/5061 718/104 |
| 2010/0074147 A1 | 3/2010 | Decasper et al. | |
| 2010/0274983 A1* | 10/2010 | Murphy | G06F 11/3485 711/162 |
| 2011/0004629 A1 | 1/2011 | Thorat et al. | |
| 2011/0154014 A1 | 6/2011 | Thorn et al. | |
| 2011/0161465 A1 | 6/2011 | Kowalski | |
| 2011/0179415 A1 | 7/2011 | Donnellan et al. | |
| 2011/0238937 A1 | 9/2011 | Murotani et al. | |
| 2011/0246416 A1 | 10/2011 | Prahlad et al. | |
| 2012/0066612 A1 | 3/2012 | Virmani | |
| 2012/0079221 A1 | 3/2012 | Sivasubramanian et al. | |
| 2012/0124443 A1 | 5/2012 | Kwak | |
| 2012/0159595 A1 | 6/2012 | Barham | |
| 2012/0233417 A1 | 9/2012 | Kalach et al. | |
| 2013/0061089 A1 | 3/2013 | Valiyaparambil et al. | |
| 2013/0074082 A1 | 3/2013 | Yu | |
| 2013/0151414 A1 | 6/2013 | Zhu et al. | |
| 2013/0268925 A1 | 10/2013 | Fuse | |
| 2014/0019414 A1 | 1/2014 | Abraham et al. | |
| 2014/0082167 A1* | 3/2014 | Robinson | G06F 11/1458 709/223 |
| 2014/0089266 A1 | 3/2014 | Une et al. | |
| 2014/0173581 A1 | 6/2014 | Grinberg | |
| 2014/0298490 A1 | 10/2014 | Clark et al. | |
| 2014/0304830 A1 | 10/2014 | Gammon | |
| 2014/0379660 A1 | 12/2014 | Vorsprach et al. | |
| 2015/0161013 A1 | 6/2015 | Cheng | |
| 2015/0205979 A1 | 7/2015 | Dong | |
| 2018/0189150 A1 | 7/2018 | Jauhal | |
| 2019/0340086 A1 | 11/2019 | Jauhal | |
| 2019/0386998 A1 | 12/2019 | Jauhal et al. | |

OTHER PUBLICATIONS

U.S. Appl. No. 13/927,400, filed Jun. 26, 2013, Juahal, Shern S.
U.S. Appl. No. 15/583,807, filed May 1, 2017, Juahal et al.
Google English translation of Chinese Application CN101795206 (A)—Aug. 4, 2010.
Ahmad et al., "Survey on secure live virtual machine (VM) migration in Cloud," 2013 2nd National Conference on Information Assurance (NCIA) Year: 2013 pp. 101-106.
Demchenko et al., "Access control infrastructure for on-demand provisioned virtualised infrastructure services," 2011 International Conference on Collaboration Technologies and Systems (CTS) Year: 2011 pp. 466-475.
U.S. Appl. No. 16/511,246, filed Jul. 15, 2019, Juahal, Shern S.

\* cited by examiner

FIG. 5

USER SELECTABLE DATA SOURCE FOR DATA RECOVERY

BACKGROUND OF THE INVENTION

1. The Field of the Invention

Embodiments of the present invention relate to backing up and restoring data. More particularly, embodiments of the invention relate to systems and methods for recovering data from a selectable source.

2. The Relevant Technology

Computers have become ubiquitous in our society and many people interact with computers every day. People use computers to work on documents, spreadsheets, or presentations, create computer code, generate and maintain databases, send email, or the like. Computers are also used, for example, to conduct online activities such as shopping or surfing.

In each case, the user is interacting with data in some form. The data is often important and it is advisable to protect the data for many reasons. Online booking agencies and associated businesses, for example, rely on up-to-date and accurate data in order to make reservations, monitor demand, or set pricing, to name a few.

Data can be protected by making a backup copy of the data. The backup copy is usually stored so that if something happens to the original data, the backup copy can be used for recovery purposes. Thus, the backup is typically stored separately from the original data or from the data currently in use. Backup data can also be used for other reasons. For example, backup data enables data to be viewed as it existed at various times in the past.

When data is protected in a data protection system, it is possible that more than one copy of the protected data exists. Creating multiple copies may be performed for various reasons. Some backups may be on long-term storage data for example. Multiple copies may also be created to protect against natural disasters. When recovering data from a backup, however, conventional systems automatically recover the data from the backup that the data protection system picks. This may not result in an optimum recovery operation.

BRIEF DESCRIPTION OF THE DRAWINGS

In order to describe the manner in which at least some of the advantages and features of the invention can be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 5 illustrates an example of a user interface for recovering data from a selectable backup source.

DETAILED DESCRIPTION OF THE PREFERRED EMBODIMENTS

Figure 1:
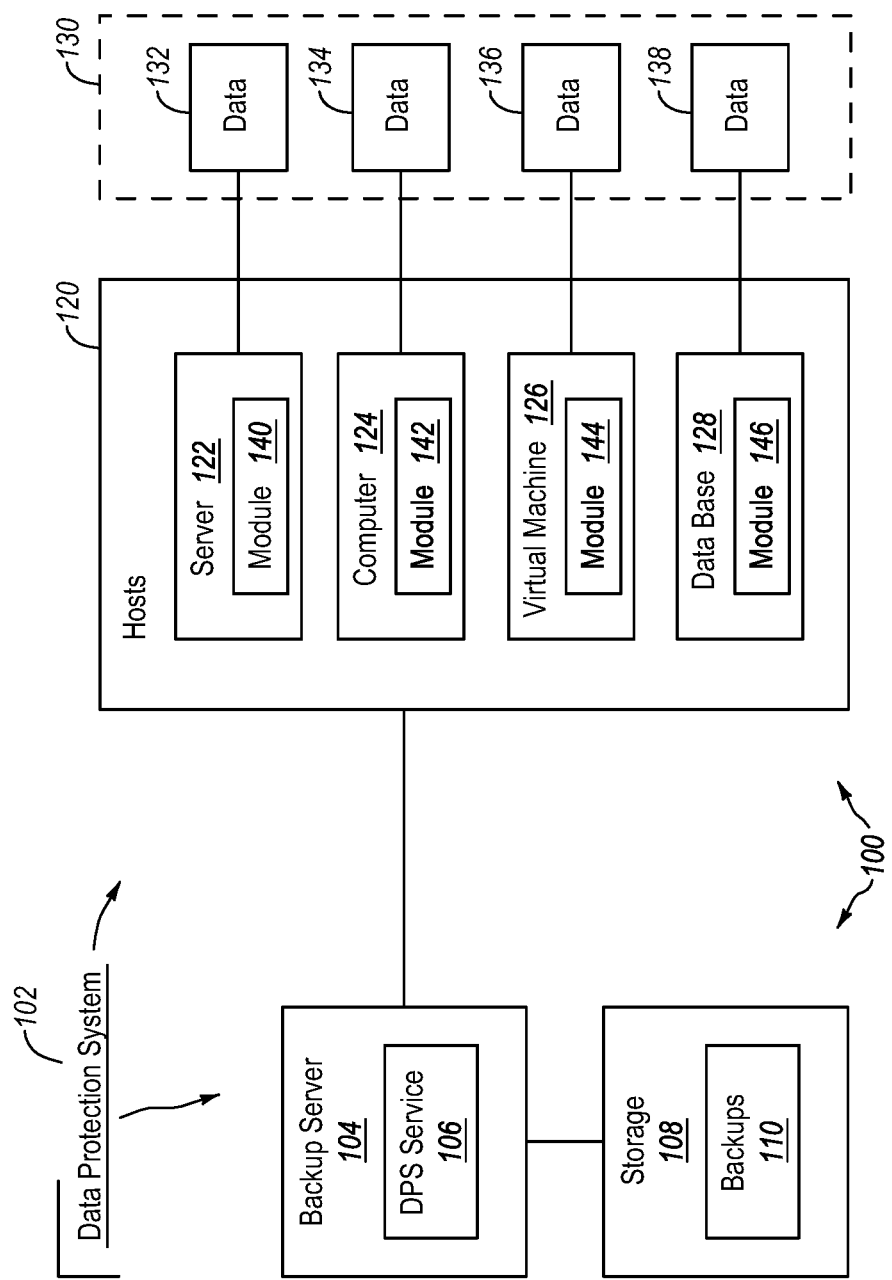
FIG. 1 illustrates an example of an environment that includes a data protection system configured to protect data.

Embodiments of the invention relate to systems and methods for protecting data. Embodiments of the invention relate a data protection system configured to protect data. Protecting data can include at least backing up the data and/or recovering the data. Embodiments of the invention enable recovery operations to be scheduled to occur in an automated manner and/or time-shifted manner. Embodiments of the invention further allow the source of the recovery operation to be selectable. When multiple copies of backup data are available, embodiments of the data protection system enable a user to select the specific backup to be used. This can optimize the recovery process, for example, by allowing the backup that is likely to be restored the quickest to be used in the recovery operation.

During a recovery operation of protected data (e.g., from a backup of the protected data), the information or configuration information necessary to perform the recovery operation is collected and saved by the data protection system. Collecting the configuration data may include a selection of a backup from which the data is restored. The data protection system may be instantiated in different locations and can be initiated from any device. In an embodiment, the selection of the backup to be used in the recovery operation can be integrated into a workflow of a recovery operation or into a workflow of configuring the recovery operation. The recovery operation can then be scheduled for execution or simply executed.

The data protection system can include various modules or components that can be installed on different devices. Some modules of the data protection system may operate on a server computer while other modules may operate on another device or computer (e.g., a host machine or host). In addition, the data protection operations discussed herein can be configured from another device. A recovery operation, for example, can be configured from a host device, from a backup server, or from another device that may be remote to both the backup server and the host device for which the recovery operation is being configured or performed.

The modules operating on the host and on the server cooperate to configure and perform the recovery operation. In some instances, embodiments of the invention enable a recovery operation to be configured and the actual recovery of the data will be performed at a later time as scheduled.

A recovery operation may be initiated through a user interface (UI) regardless of how the host is configured (e.g., a client device, a server, a database, a filestore, etc.) and regardless of the type of data on the host. The user interface may present a user with a workflow that may walk a user through the process of configuring the recovery operation. The configuration information is collected during execution of the workflow and may be stored until the scheduled time. Some aspects of the user interface or of the workflow may be common to all or most recovery operations that may be performed on other hosts. Other aspects of the workflow may be dynamically added to the user interface. For example, the user interface may include a plug-in that allows portions of the workflow to be adapted to the specific circumstances of the host and the host of the data.

FIG. 1 illustrates an example of an environment 100 that includes a data protection system 102 configured to protect data. Data can be protected by backing up the data and/or recovering or restoring the data and/or by configuring backup or recovery operations. The data protection system 102 in the environment 100 includes modules that are configured to backup data and/or recover data.

The environment 100 may be a network such as a local area network, a wide area network, or any other networked configuration. The environment 100 may include various devices including servers and other computers that are interconnected. The data stored in the system and/or the software operating the environment 100 may be cloud based, network based, or single computer based or combination thereof. The data protection system 102 or portions thereof may be implemented in a cloud or internet environment or other networked environment.

The data protection system 102 is implemented in the environment 100. The components or modules of the data protection system 102 can be installed on multiple devices. The data protection system 102 can include both server side components or modules and device or host side components or modules. The various modules cooperate to protect data in the environment 100. The data protection system 102 can include hardware and/or software aspects.

The data protection system 102 may include, by way of example only, a backup server 104. A data protection system (DPS) service 106 may be operating on the backup server 104 or on another computer that coordinates with the backup server 104. The DPS service 106 may be web-enabled to enable remote access.

FIG. 1 further illustrates that the environment 100 includes hosts 120. The number of hosts 120 in the environment 100 (e.g., in a network) can vary and can be of different types. In one example, the hosts 120 may all be part of the same network or associated with the same entity. The hosts 120 can include, by way of example only, servers 122 (e.g., a file server, an email server), computers 124 (e.g., desktop computers, laptop computers, tablet devices, smartphones), virtual machines 126, databases 128, or the like or any combination thereof. Each of the hosts 120 is often associated with its own data. The server 122 is associated with the data 132, the computer 124 is associated with the data 134, the virtual machines 126 have the data 136 (the storage for the virtual machines may an integral part of the virtual machines), and the database 128 is associated with the data 138.

The data protection system 102 may also include or be associated with storage 108. The storage 108 is configured to store backups 110, which are backups of data in the environment 100. In one example, the backups 110 may include redundant backup copies.

The storage 108 may be networked storage, cloud based storage, disk arrays, tape media or the like or any combination thereof. The backups 110 may include backups of the data 130 of the hosts 120. The storage 108 may be embodied as different types of media and may include one or more media pools. The various media pools may be physically separated and in different locations.

Generally, the data 130 of the environment may be stored on a storage pool, on hard disk arrays, on networked storage or the like or any combination thereof. Alternatively, some of the storage for some of data 130 may be specific to a particular host. For instance, the data 138 of the database 128 may be resident on storage that is not available to other hosts. Alternatively, the data 138 may correspond to part of a storage pool or file server that has been assigned to the database 128. Other hosts may be similarly configured. More generally, however, the data 130 may be stored on multiple storage devices and in various storage configurations. Because the storage 108 may be associated for the backups 110, the storage 108 may be physically distinct from the storage used for the data 130.

In the data protection system 102, the DPS service 106 cooperates with modules 140, 142, 144, and 146 to perform backup and/or recovery operations. When recovering the server 122, for example, the DPS service 106 coordinates with the module 140 to recover the data 132 or to recover a portion of the data 132. The DPS service 106 may also coordinate with the module 140 to configure the recovery operation for the server 122.

Backup and/or recovery operations can be performed for each of the hosts 120 individually. The recovery of data for a particular host, however, may also impact another host. For example, if the server 122 is an email server and the data 132 corresponds to the mailboxes of multiple users, then recovery of the data 132 may have an impact on other hosts—for example the computers 124 associated with the users. In addition, data can be restored to a new host that is not the host from which the data was backed up. Also, the specific backup used in the recovery operation can be selected by a user.

The backups 110 can include one or more backups of each of the hosts 120. Advantageously, the data of the hosts 120 can be recovered at different points of time. The backups 110 may include full backups, partial backups, snapshots, content addressed data, de-duplicated data, or the like or any combination thereof.

Figure 2:
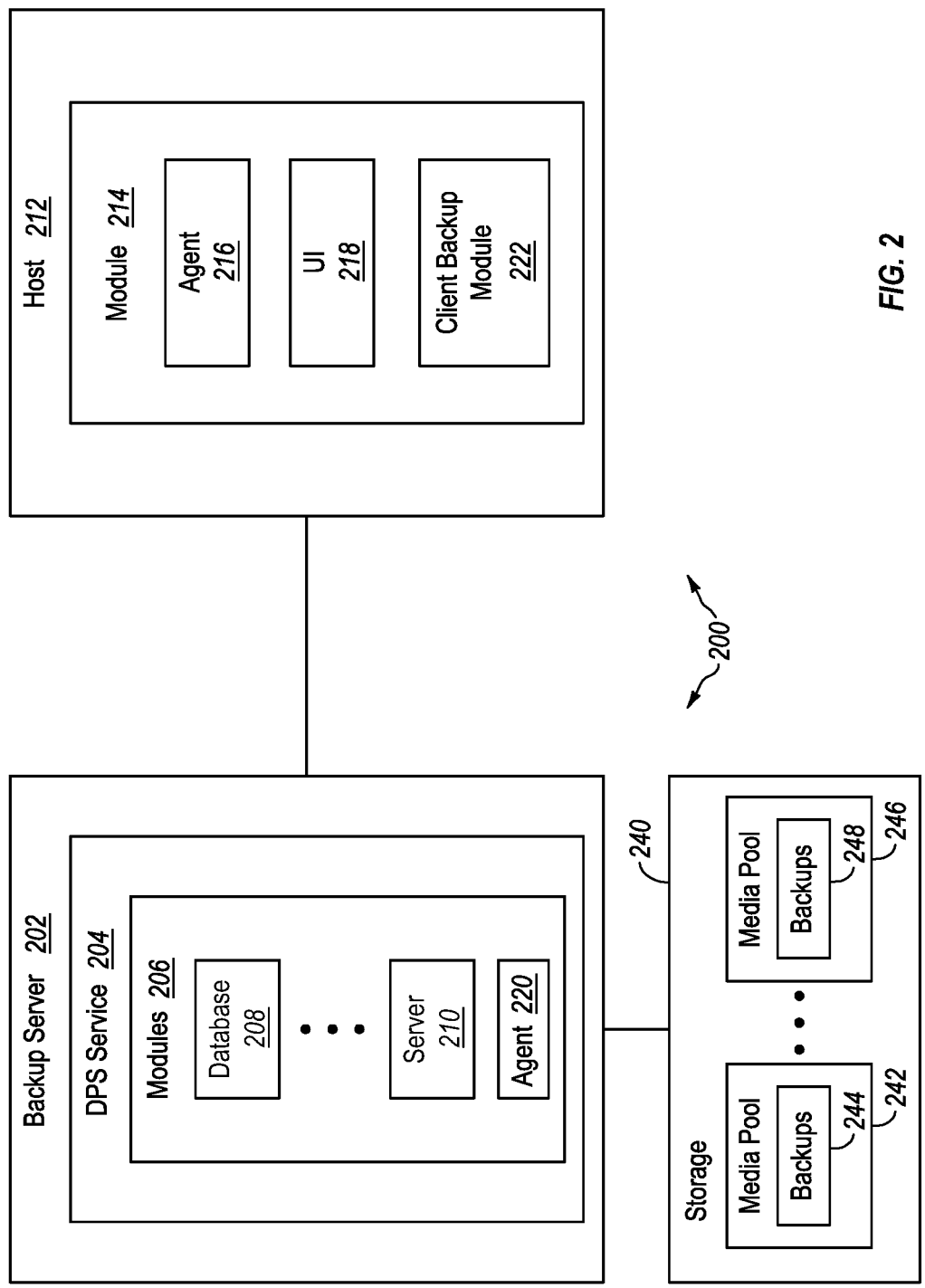
FIG. 2 illustrates an example of a backup server and a host in the context of a data protection system that stores redundant copies of the backups.

FIG. 2 illustrates an example of a backup server 202 and a host 212 in the context of a data protection system 200. The backup server 202 is an example of the backup server 104 and the host 212 is an example of one of the hosts 120. During a backup or recovery operation, the backup server 202 coordinates with the host 212 or, more specifically, the DP service 204 coordinates with the agent 216. The configuration of a backup or recovery operation, however, may be performed from the host 212 or from another device.

The DPS service 204 coordinates with the module 214 to configure and/or perform the recovery or backup operation to protect data of the host 212. The module 214 on the host 212 includes an agent 216 and a user interface 218 and a client backup module 222 that participate, in some embodiments, in the recovery and/or backup operations.

The DPS service 204 may be web enabled. This allows a user to configure a recovery operation for the host 212 from another location or device. The user interface and plug in presented over the web interface may be the same as the user interface used at the host 212 for a recovery operation.

In one example, the user interface 218 is initiated (whether on the host 212 or on a remote device) and the host 212 is selected as the destination of the recovery operation, although another host may be designated as the destination of the recovery operation. The module 214 is then queried to identify and select a client backup module 222, which can influence the workflow presented in the user interface 218. The client backup module 222 is part of the data protection software and is designed to protect the storage or data of the host 212 host in a particular way. For example, the client backup module 222 may protect a native or attached file system storage in a particular way or may protect a running application such as a database or mail server in another way. The client backup module 222 may be used to retrieve one of the modules 206 that can be plugged-in to the user interface 218. The database module 208 may be used when the host 212 is a database and the server module 210 may be used when the host 212 is a server.

After the client backup module is selected, the host agent 216 is initiated. The host agent 216 implements an interface between the user interface 218 and retrieves one of the modules 206, which may be plug-ins, as previously stated. The DPS service 204 may include modules for various versions of the module 214. This can simplify development of the module 214, the client backup module 222, and/or the user interface 218.

The user interface 218 can communicate with the agent 216, which allows the agent 216 to perform any tasks necessary to configure and/or perform the recovery operation. The recovery operation can then commence once the recovery operation is configured.

When a recovery operation is configured and scheduled, the configuration information, the scheduling information, and/or the type of recovery can be maintained as persistent data. The backup server 202 can use the persistent data to perform the scheduled recovery operation at the scheduled time.

FIG. 2 further illustrates that the backups of the host 212 include redundant copies. In FIG. 2, the storage 240 includes a first media pool 242 that stores a first copy 244 of the backups and a second media pool 246 that stores a second copy 248 of the same backups. The media pool 242 and the medial pool 246 may be different storage devices, may be located in different locations, and may be of different types of devices.

Figure 3:
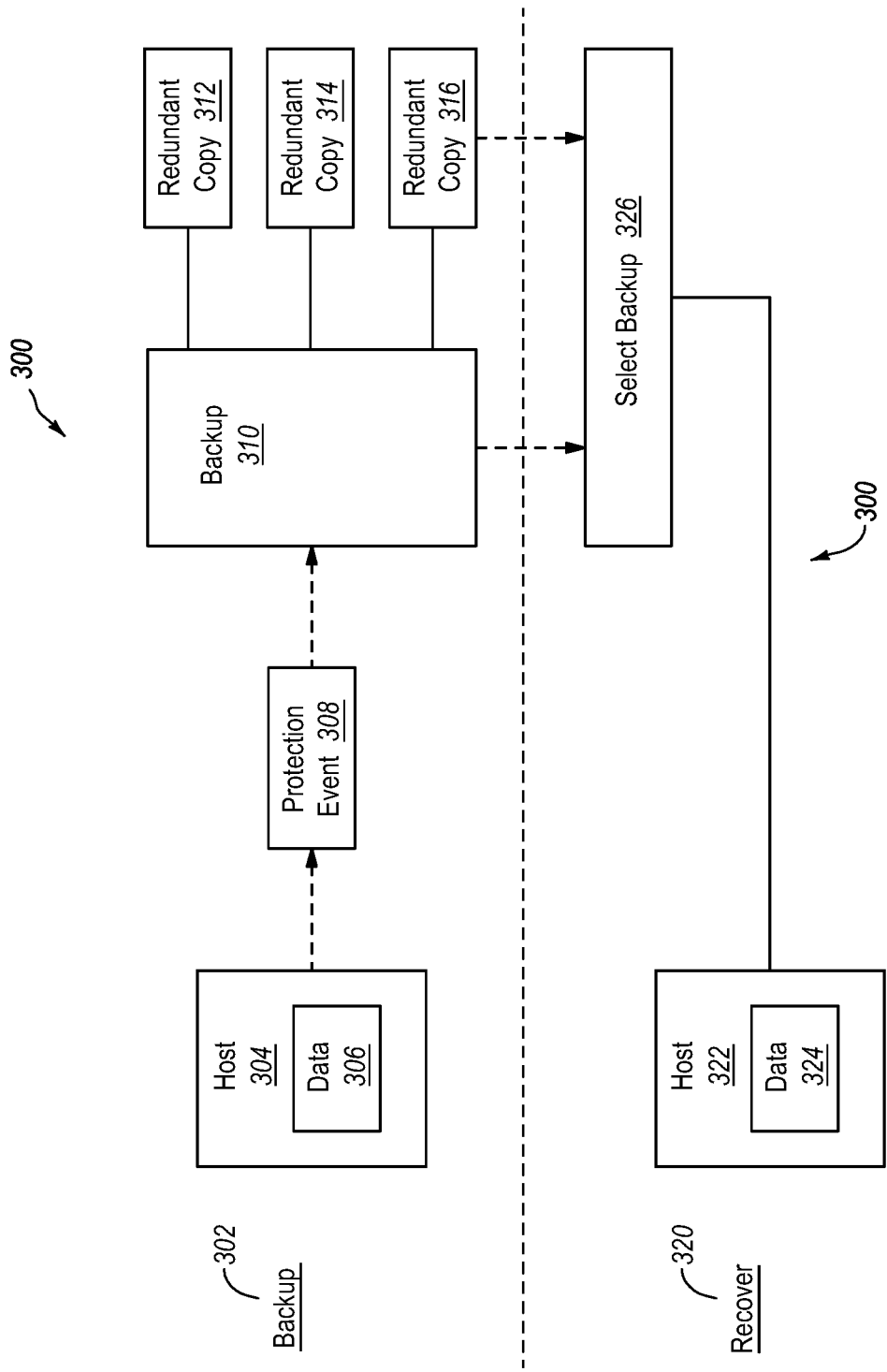
FIG. 3 illustrates a block diagram of a system for recovering data from a selectable backup source.

FIG. 3 illustrates a block diagram of a system that includes a data protection system that enables recovering data from a selectable source. FIG. 3 illustrates a data protection system 300 that illustrates a backup operation 302 and a recovery operation 320. When a protection event 308 (e.g., backing up data or recovering data) occurs, a backup copy 310 of the data 306 of the host 304 is generated. The backup copy 310 may be a full backup, a partial backup, a snapshot, a mirrored copy, a de-duplicated copy, or the like. In some instances, de-duplication may be specific to a media pool even when multiple copies of the backup exists in different media pools.

Once the backup 310 is generated, redundant backups 312, 314, and 316 may be generated. The redundant backups 312, 314, and 316 can be generated simultaneously with the backup 310 or at a later time. The backup 310 and the redundant backups 312, 314, and/or 316 may be stored in different media pools.

FIG. 3 also illustrates a host 322, which is a destination of the recovery operation 320. The host 322 may be the same as the host 304 or may be another host. During the recovery operation 322, the source of the data 324 being restored by be selected. More specifically, the backup is selected in 326. Input may be received in a user interface that identifies one of the backup 310, the redundant backup 312, the redundant backup 314, or the redundant backup 316. The selected backup is then restored to the host 322 as the data 324.

Figure 4:
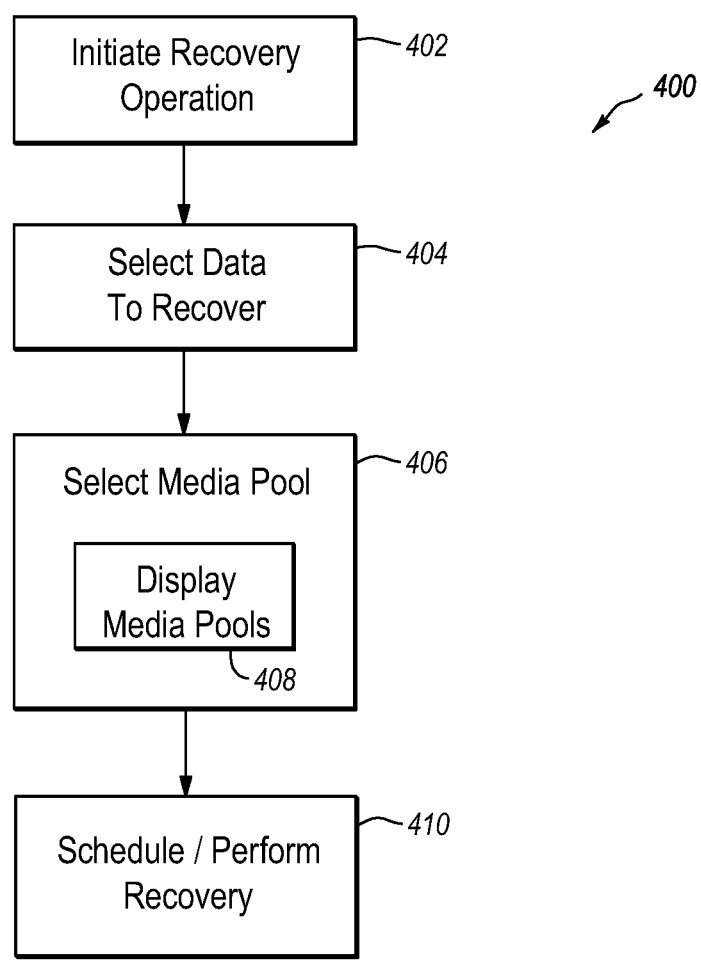
FIG. 4 illustrates a flow diagram for recovering data from a selectable backup source.

FIG. 4 illustrates a flow diagram for recovering data from a selectable backup source. A recovery operation is initiated in box 402. In box 404, the data to be recovered is selected. This may include identifying what is to be restored. For example, a particular file, a mailbox, a database or the like.

In box 406, the media pool is selected. This can include displaying all or available copies of the backups in a user interface during configuration of the recovery operation in box 408. A user may provide input into the user interface selecting one of the available copies. In this manner, the backup is selected.

In addition to displaying the available copies of the backup, the user interface may also include information about each copy. For example, location, type of media, type of connection, or the like. A user may select one of the backups based on a location of the backup or a location of the volume or media pool selected for performing the recovery operation. For example, a backup that is geographically closer to the host may result in a faster recovery operation.

When selecting a backup for recovery, a user may be able to better identify the best source or the best backup to use for the recovery operation. The ability to allow a user to select the backup for the recovery operation can improve the recovery operation. For example, redundant copies of data may reside in two data centers. A recovery operation may be optimized if the data center that is local to a user is used. Restoring data from a remote data center may require additional processing and may be subject to slower network speeds. For example, restoring from a remote location may require the data to be encrypted and decrypted while restoring from a local connection may not require encryption or decryption.

In another example, the purpose of the recovery operation may be to ensure that a particular media is readable and that the data can be recovered from the particular media. In this example, the recovery operation may be for verification purposes and allowing the user to select the backup can enable the backup to be validated. For example, if one backup is on tape and another backup is on a much faster media, the recovery operation may always default to the faster media, which makes it difficult to recover from the tape. Allowing the user to select the backup or the media used for the recovery operation enables the recovery operation to recover from the tape media in a quick fashion even when a faster media is available for the recovery operation.

The recovery operation can be applied to a file, to a group of files, to an entire database, or the like.

In box 410, the recovery operation that has been appropriately configured and for which the data and media pool have been selected can be scheduled or performed.

The method of FIG. 4 may include additional configuration details. Configuring a recovery operation may include accessing the DPS service, selecting a host, selecting a backup to recover to the host, selecting a type of recovery based on the client backup module, or the like.

Embodiments of the invention can make the recovery operation an automated process and enable a recovery operation to be performed un-attended from a user-selected recovery source.

Figure 5:
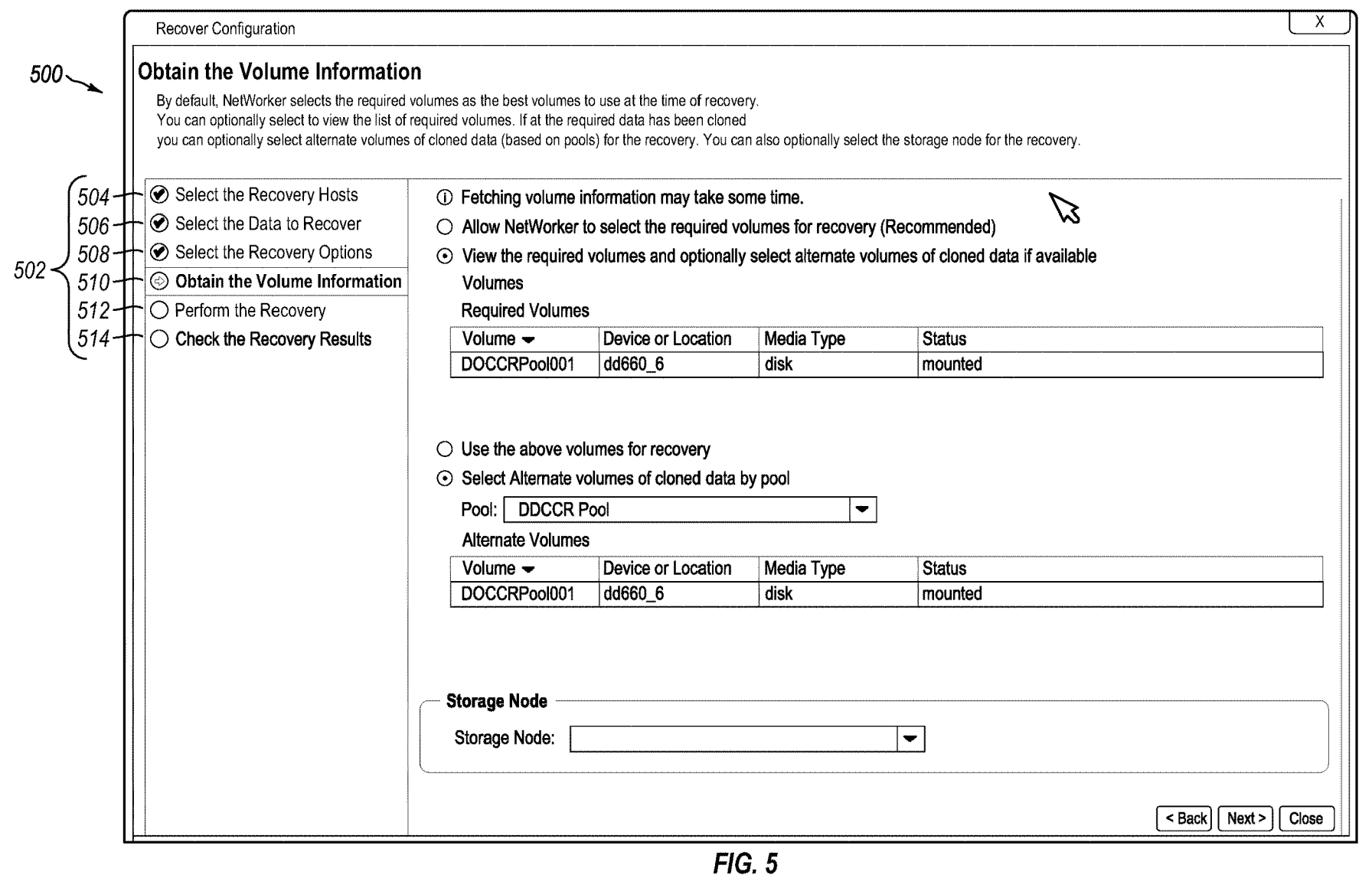

FIG. 5 illustrates an example of a user interface for recovering data from a selectable backup source. FIG. 5 illustrates a user interface 500 that illustrates a workflow 502 for configuring a recovery operation and/or performing the recovery operation. At 504, the client or host to recover is selected. At 506, the data to recover is selected. As previously stated, this may include identifying which data is to be recovered. The data to be recovered is included in each backup.

At 508, the recovery options are selected. The recovery options may include where the recovered data should be stored (i.e., the destination for the data), options for recovery when the data or a file already exists (e.g., overwrite, do not recover, recover with a different file name, append to the end of the existing file, or the like.

At 510, the volume information is obtained for each backup (e.g., the backup may reside on a volume). This is an example of allowing the backup source to be selected. Each volume may be in a different media pool, for example. The user interface 500 may display, for each volume, the device or location, the media type, and the status (e.g., mounted, unmounted). At 512, the recovery operation is performed and at 514, the recovered data may be verified or validated.

The DPS system can protect the data of a host through, by way of example, a series of periodic data protection events (e.g., snapshots or other backup). At some point in time, a request is made to recover at least a portion of the data. A recovery operation, which is performed to recover the requested data, can be scheduled in multiple ways—ad hoc, periodic, validating, or combination thereof. The user interface on the host (or on another device) is started and a host is selected for a recovery operation. While configuring the recovery operation, the backup used for the recovery may be also selected, for example by selecting a particular volume.

When displaying the available backups, a list of volumes or media or media pools may be displayed in the user interface and the user can select the desired backup for the recovery operation.

The embodiments described herein may include the use of a special purpose or general-purpose computer including various computer hardware or software modules, as discussed in greater detail below. Embodiments of the invention relate to methods for protecting data, devices configured to protect data, and computer-readable media.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention can be performed in client-server environments, whether network or local environments, or in any other suitable environment. Suitable operating environments for at least some embodiments of the invention include cloud computing environments where one or more of a client, server, or target virtual machine may reside and operate in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for performing a recovery operation to recover data to a host, the method comprising:
   initiating a workflow for configuring a recovery operation to restore a backup, the workflow including a plurality of elements, wherein the plurality of elements relate to recovery operations that are common to workflows for different hosts;
   dynamically adapting the workflow, by a recovery module that is selected based on a manner in which data of the host was backed up, to account for a specific circumstance of the host and of data associated with the host by adding an element to the workflow, changing one of the plurality of elements in the workflow, and/or removing one of the plurality of elements from the workflow;
   adapting the workflow to include multiple media pools, wherein a copy of the backup is stored in each of the media pools;
   receiving input into the dynamically adapted workflow that is displayed in a user interface on a display, wherein the input includes a selection of a particular media pool from the multiple media pools; and
   recovering the data of the host from the backup in accordance with the workflow from a backup stored at the particular media pool.

2. The method of claim 1, further comprising initiating a recovery operation for the host and issuing a query to the host to identify the manner in which the data of the host was backed up.

3. The method of claim 2, further comprising
   selecting a recovery module based on the query, wherein the recovery module is related to the manner in which the data of the host was backed up and wherein the recovery module is selected from a library of recovery modules maintained by a server; and
   retrieving the recovery module from the server.

4. The method of claim 1, further comprising:
   displaying a list of available backups in different media pools, wherein each of the backups includes a copy of the data selected for recovery and wherein each of the backups includes the same data; and
   selecting one of the backups from the list of available backups from one of the media pools.

5. The method of claim 1, further comprising configuring the recovery operation by selecting recovery options.

6. The method of claim 1, further comprising displaying information about each of the backups in the list of available backups, wherein the information includes one or more of a device, a location, a media type, or a status.

7. The method of claim 1, further comprising receiving user input in the user interface, wherein the user input identifies the selected backup used to recover the data to the host.

8. The method of claim 1, wherein the plurality of elements in the workflow include a first portion that is common to the user interface for recovering different types of hosts and a second portion that are adapted by the recovery module, wherein a manner in which the second portion are adapted depends on the type of host, and wherein the recovery module is a plug-in.

9. A storage device comprising a non-transitory medium having stored therein computer-executable instructions which, when executed by one or more hardware processors of a computing system, implement a method for performing a recovery operation for a host, the method comprising:
  initiating a workflow for configuring a recovery operation to restore a backup, the workflow including a plurality of elements, wherein the plurality of elements relate to recovery operations that are common to workflows for different hosts;
  dynamically adapting the plurality of elements in the workflow, by a recovery module that is selected based on a manner in which data of the host was backed up, to account for a specific circumstance of the host and of data associated with the host by adding an element to the plurality of elements in the workflow, changing one of the plurality of elements in the workflow, and/or removing one of the plurality of elements from the workflow;
  adapting the workflow to include multiple media pools, wherein a copy of the backup is stored in each of the media pools;
  receiving input into the dynamically adapted workflow that is displayed in a user interface on a display, wherein the input includes a selection of a particular media pool from the multiple media pools; and
  recovering the data of the host from the backup in accordance with the workflow from a backup stored at the particular media pool.

10. The storage device of claim 9, further comprising initiating a recovery operation for the host and issuing a query to the host to identify the manner in which the data of the host was backed up.

11. The storage device of claim 10, further comprising selecting a recovery module based on the query, wherein the recovery module is related to the manner in which the data of the host was backed up and wherein the recovery module is selected from a library of recovery modules maintained by a server; and
  retrieving the recovery module from the server.

12. The storage device of claim 9, further comprising displaying a list of available backups in different media pools, wherein each of the backups includes a copy of the data selected for recovery and wherein each of the backups includes the same data and selecting one of the backups from the list of available backups from one of the media pools.

13. The storage device of claim 9, further comprising configuring the recovery operation by selecting recovery options.

14. The storage device of claim 9, further comprising displaying information about each of the backups in the list of available backups, wherein the information includes one or more of a device, a location, a media type, or a status.

15. The storage device of claim 9, further comprising receiving user input in the user interface, wherein the user input identifies the selected backup used to recover the data to the host.

16. The storage device of claim 9, wherein the plurality of elements in the workflow include a first portion that is common to the user interface for recovering different types of hosts and a second portion that are adapted by the recovery module, wherein a manner in which the second portion are adapted depends on the type of host and wherein the recovery module is a plug-in.

17. A computing device comprising:
  at least one processor; and
  one or more programs configured to configure and perform a recovery operation, the one or programs including computer executable instructions on a non-transitory medium that, when executed by the at least one processor, provide:
    an agent configured to initiate a workflow to configure the recovery operation to recover a backup, the workflow including a plurality of elements; and
    a user interface component configured to display a user interface on a display that includes the workflow, wherein the user interface component is operable to access a recovery module to dynamically adapt the workflow to account for a specific circumstance of the host and of data associated with the host by adding an element to the workflow, changing one of the plurality of elements in the workflow, and/or removing one of the plurality of elements from the workflow, wherein the workflow is adapted based on a manner in which data of the host was backed up, wherein input is received into the dynamically adapted workflow;
    adapt the workflow to include multiple media pools, wherein a copy of the backup is stored in each of the media pools;
    receive input into the dynamically adapted workflow that is displayed in a user interface on a display, wherein the input includes a selection of a particular media pool from the multiple media pools; and
  wherein the one or more programs identify a manner in which data of the host was protected and then retrieve the recovery module from a server based on the manner in which the data of the host was protected and wherein the one or more programs recover the data of the host from a backup stored at the particular media pool, in accordance with the dynamically adapted workflow.

18. The computing device of claim 17, wherein the workflow is configured to generate configuration information for the recovery operation including selecting data for recovery and selecting a backup from a list of available backups that contain redundant copies of the selected data, wherein recovery of the selected backup is expected to be more efficient than recovery of the other available backups, wherein the agent cooperates with the dynamically adapted workflow presented in the user interface to perform tasks related to configuring the recovery operation and the recovery of the data to the host, wherein each backup in the list of available backups is associated with information that is displayed in the user interface, wherein the information includes at least one of a device, a location, a media type, and a status, wherein each of the backups is stored in a different media pool, the media pool including storage devices.

* * * * *